(12) United States Patent
Kim

(10) Patent No.: US 7,583,938 B2
(45) Date of Patent: Sep. 1, 2009

(54) MOBILE COMMUNICATION DEVICE HAVING SPEAKER UNIT

(75) Inventor: Hee-Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 430 days.

(21) Appl. No.: 11/267,806

(22) Filed: Nov. 4, 2005

(65) Prior Publication Data

US 2006/0084468 A1 Apr. 20, 2006

(30) Foreign Application Priority Data

Nov. 4, 2004 (KR) ...................... 10-2004-0089450

(51) Int. Cl.
*H04B 1/38* (2006.01)

(52) U.S. Cl. ................ 455/90.3; 455/575.3; 455/575.1; 455/575.6; 455/556.1; 455/566; 379/428.01; 379/433.04; 379/433.12

(58) Field of Classification Search ................ 455/90.3, 455/575.3, 575.1, 566, 575.4, 575.6, 556.1, 455/557; 379/447, 433.04, 426.01
See application file for complete search history.

(56) References Cited

U.S. PATENT DOCUMENTS

| | | | |
|---|---|---|---|
| 6,047,196 A * | 4/2000 | Makela et al. ............. | 455/556.1 |
| 6,631,191 B1 * | 10/2003 | Holmberg ............... | 379/433.02 |
| 6,700,784 B2 * | 3/2004 | Huang et al. ................ | 361/715 |
| 6,758,303 B2 * | 7/2004 | Zurek et al. .................. | 181/155 |
| 6,771,981 B1 * | 8/2004 | Zalewski et al. ............. | 455/557 |
| 6,944,484 B2 * | 9/2005 | Yasuda ..................... | 455/575.3 |
| 6,957,083 B2 * | 10/2005 | Ikeda et al. ............... | 455/556.1 |
| 7,079,832 B2 * | 7/2006 | Zalewski et al. ............. | 455/405 |
| 7,136,688 B2 * | 11/2006 | Jung et al. ................ | 455/575.4 |
| 7,233,678 B2 * | 6/2007 | Erixon et al. ................ | 381/345 |
| 7,236,588 B2 * | 6/2007 | Gartrell .................. | 379/433.01 |
| 7,269,255 B2 * | 9/2007 | Satoh et al. ............ | 379/428.01 |
| 7,299,078 B2 * | 11/2007 | Ahn ......................... | 455/575.4 |
| 7,408,514 B2 * | 8/2008 | Go .............................. | 343/702 |

FOREIGN PATENT DOCUMENTS

| | | |
|---|---|---|
| EP | 1 594 295 | 11/2005 |
| JP | 05-260143 | 10/1993 |
| JP | 8139794 | 5/1996 |
| JP | 2002-051130 | 2/2002 |
| WO | WO 2004/043127 A1 | 5/2004 |
| WO | WO 2004/073287 | 8/2004 |

* cited by examiner

*Primary Examiner*—Marceau Milord
(74) *Attorney, Agent, or Firm*—Lee, Hong, Degerman, Kang & Waimey

(57) ABSTRACT

A mobile communication device is provided that includes a first body, a second body hingedly-coupled to the first body and speaker unit installed in the second body such that sound generated when the first body is folded closed with respect to the second body can be directly transferred outside the mobile communication device. Using the present invention, a user can listen to high-quality reproduced sound without distortion even when the first body is folded closed with respect to the second body and reliability and competitiveness of a product can be improved.

19 Claims, 4 Drawing Sheets

MOBILE COMMUNICATION DEVICE HAVING SPEAKER UNIT

CROSS-REFERENCE TO RELATED APPLICATIONS

Pursuant to 35 U.S.C. § 119(a), this application claims the benefit of earlier filing date and right of priority to Korean Application No. 89450/2004, filed on Nov. 4, 2004, the contents of which is hereby incorporated by reference herein in its entirety:

BACKGROUND OF THE INVENTION

1. Field of the Invention

The present invention relates to a mobile communication device, and specifically to a flip-type mobile handset device having a speaker unit configured to allow a user to listen to high quality sound, such as music, regardless of the open or closed configuration of the handset.

2. Description of the Related Art

A mobile communication device, such as a mobile handset, is a wireless mobile communication device that a user may use anywhere and which may be conveniently carried. The number of users of mobile handset terminals is rapidly increasing and the usable range of such devices also has expanded.

Initially, mobile handset devices had only voice transmission and reception functions. However, as the usable range expanded, mobile handset devices have been developed to incorporate various functions, such as transmission of text messages and various information, wireless access to the Internet and multimedia functions.

Furthermore, the latest mobile handset devices are able to download various sound information, such as music, from a computer and reproduce the downloaded music. In order to reproduce a sound close the original sound, the mobile handset devices are provided with a high quality speaker.

FIG. 1 illustrates a structure of a conventional folder-type mobile handset device configured to reproduce music or other sounds. The mobile handset device 1 includes a main body 10 having a main PCB (Printed Circuit Board) therein (not shown) and a folder part 20 hingedly connected to the main body 10. A first keypad 13 for inputting various characters and number information is provided at an inner surface 11 of the main body 10 and a second keypad 15, including various control keys and communication and power keys, is provided above the first keypad 13. A main display 25 for displaying characters and images is provided at an inner surface 21 of the folder part 20, and an auxiliary display (not shown) is provided at an outer surface 22 of the folder part 20. A voice (sound) output unit 27 for outputting the voice of another party in conversation is provided at the inner surface 21 of the folder part 20 and a voice input unit 17 for inputting the voice of a user is provided at the inner surface 11 of the main body 10.

Various music and sound information, such as an MP3 file, stored in a memory chip may be output through a speaker 30 provided at the main body 10 as, for example, interactive 3-D sound or surround sound. The speaker 30 is provided at an upper side of the inner surface 21 of the folder part 20, for example, at both sides of the voice (sound) output unit 27. Two speakers 30 are provided at a predetermined interval in order to reproduce music with an improved stereo sound.

In order to reproduce a sound source, such as music, stored in a conventional folder type mobile terminal having such a structure, a user inputs a command to reproduce the stored sound source by using the second keypad 15 when the folder part 20 is opened with respect to the main body 10. The sound source stored in the memory chip is then reproduced and output through the pair of speakers 30. The stored sound source may also be reproduced when the folder part is closed with respect to the main body 10 by using manipulation keys (not shown) provided on the outer surface 22 of the folder part 20.

However, in the conventional mobile handset device, when the folder part 20 is closed with respect to the main body 10, the speaker unit 30 provided at an upper side of the inner surface 21 of the folder part is covered by the main body. Therefore, if the stored sound source is reproduced when the folder part 20 is closed with respect to the main body 10, a sound from the speaker unit 30 is not properly output outside the mobile handset device 1 because the main body interferes with sound wave propagation. Accordingly, the quality of the sound through the speaker unit 30 deteriorates.

Furthermore, because the speaker unit 30 is fixed at a certain position of the mobile handset device 1, the direction in which the sound is propagated is limited. Therefore, the sound cannot be propagated through the speaker in various directions and user satisfaction may be adversely affected.

Therefore, there is a need for a mobile communication device that can effectively propagate reproduced sound outside the device without deterioration regardless of the open or closed configuration of the device. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide a mobile communication device having a speaker unit configured to allow a user to effectively listen to a high quality sound such as music regardless of the open or closed configuration of the device. A speaker unit is provided which may be moved between a position in which the speaker unit protrudes from the surface of the mobile communication device and a position in which the speaker unit is retracted within the device and a sound transfer channel is provided to effectively transfer sound outside the device when the speaker unit is in the retracted position.

In one embodiment of the present invention, a mobile communication device is provided. The mobile communication device includes a first body having an inner surface and an outer surface, a second body coupled to the first body and having an inner surface and an outer surface and adapted to move relative to the first body such that the mobile communication device has an open configuration and a closed configuration, the inner surface of the first body adjacent the inner surface of the second body in the closed configuration, and a speaker unit installed in the second body such that sound generated when the mobile communication device is in the closed configuration is transferred directly outside the mobile communication device.

It is contemplated that the speaker unit is installed at the outer surface of the second body and adapted to move relative to the outer surface of the second body such that the speaker unit has a protruded configuration and a retracted configuration. Preferably, the speaker unit extends away from the outer surface of the second body when the speaker unit is in the protruded configuration and the speaker unit is inside the second body when the speaker unit is in the retracted configuration.

It is contemplated that the speaker unit includes one or more pairs of speakers adapted to move together when the speaker unit is moved between the protruded configuration and the retracted configuration. It is further contemplated that sound transfer channel is formed in the second body and adapted to transfer sound outside the second body when the speaker unit is in the retracted configuration.

It is contemplated that the sound transfer channel includes a first plurality of through holes formed at the inner surface of the second body. Preferably, the first plurality of through holes are aligned with one or more pairs of speakers.

Preferably, the sound transfer channel includes a second plurality of through holes formed at a lateral surface of the second body. Preferably, the second plurality of through holes are formed at regular intervals along the lateral surface of the second body.

It is contemplated that one or more mounting holes are formed at the outer surface of the second body and adapted to receive the speaker unit therein and that the mounting holes are covered by the speaker unit when the speaker unit is in the retracted configuration. It is further contemplated that mounting holes include a mounting apparatus to which the speaker unit is mounted. Preferably, a keypad is provided at the inner surface of the first body and a display is provided at the inner surface of the second body with the speaker unit provided in a space formed between the display and an end of the second body.

It is contemplated that a driving unit is provided in the second body, the driving unit operatively connected to the speaker unit and adapted to facilitate movement of the speaker unit between a protruded configuration and a retracted configuration. It is further contemplated that the driving unit is connected to a rear surface of the speaker unit such that the driving unit pivots the speaker unit. Preferably, the driving unit includes a sector gear installed in the second body, a pinion gear engaged with the sector gear and a connection lever such that a first end portion of the connection lever is attached to a shaft of the sector gear and a second end portion of the connection lever is attached to the speaker unit.

In another embodiment of the present invention, a mobile communication device is provided. The mobile communication device includes a first body having a keypad, a second body coupled to the first body and including a display and adapted to move relative to the first body such that the mobile communication device has an open configuration and a closed configuration, and a speaker unit installed in the second body and adapted to move relative to an outer surface of the second body such that sound generated when the mobile communication device is in the closed configuration is transferred directly outside the mobile communication device.

It is contemplated that the speaker unit is installed in a space between the display and an end of the second body. It is further contemplated that a sound transfer channel is formed in the second body and adapted to transfer sound outside the second body when the speaker unit is in a retracted configuration.

It is contemplated that the sound transfer channel includes a plurality of through holes formed at an inner surface of the second body. Preferably, the sound transfer channel includes a plurality of through holes formed at a lateral surface of the second body.

The foregoing and other objects, features, aspects and advantages of the present invention will become more apparent from the following detailed description of the present invention when taken in conjunction with the accompanying drawings. These and other embodiments will also become readily apparent to those skilled in the art from the following detailed description of the embodiments having reference to the attached figures, the invention not being limited to any particular embodiments disclosed.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a mobile communication device having a speaker unit configured to allow a user to listen to high quality sound, such as music, regardless of the open or closed configuration of the device. Although the present invention is illustrated with respect to a flip-type mobile handset device, it is contemplated that the present invention may be utilized anytime it is desired to propagate sound from a mobile communication device.

Reference will now be made in detail to the preferred embodiments of the present invention, examples of which are illustrated in the accompanying drawings. A plurality of embodiments of a sound generation apparatus of a mobile handset device may exist, and the most preferred embodiments will be described.

Figure 1:
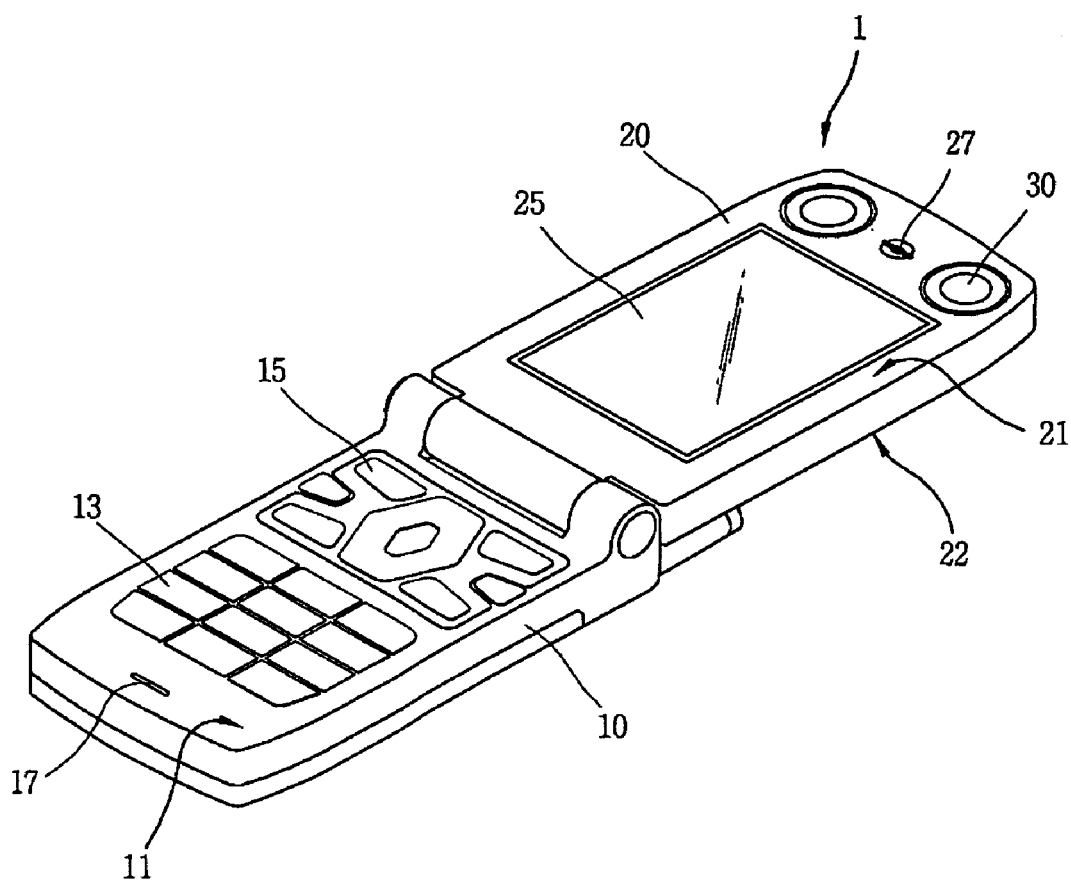
FIG. 1 illustrates a perspective view of a conventional folder-type mobile handset device.
Figure 2:
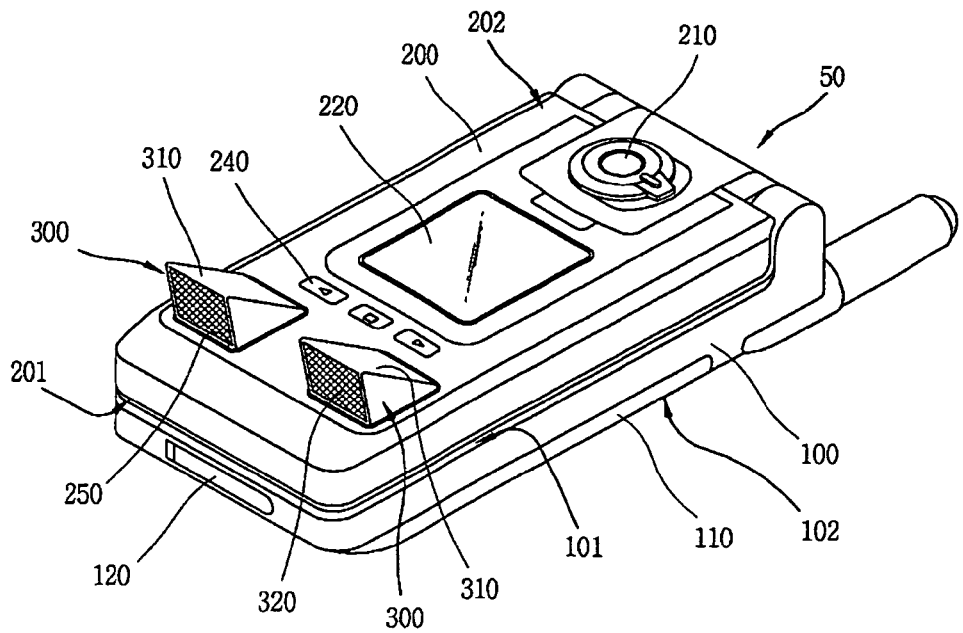
FIG. 2 illustrates a perspective view of a mobile handset device having a sound generation apparatus in accordance with one embodiment of the present invention.
Figure 3:
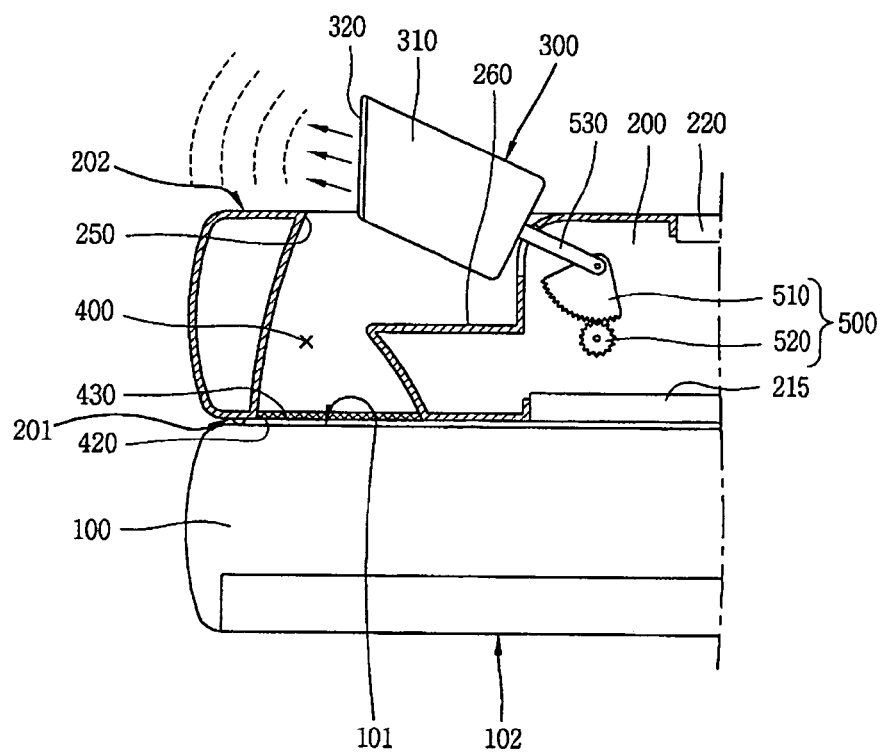
FIG. 3 illustrates a side view of a protruded configuration of a sound generation apparatus of a mobile handset device in accordance with one embodiment of the present invention.

FIG. 2 is a perspective view that illustrates a mobile handset device 50 having a sound generation apparatus in accordance with one embodiment of the present invention. FIGS. 3 and 4 are side views that illustrate operation of a sound generation apparatus in accordance with one embodiment of the present invention.

As illustrated in FIG. 2, the mobile handset device 50 includes a first body 100 and a second body 200 hingedly coupled to the first body. As illustrated, the first body 100 is folded closed with respect to the second body 200.

A keypad (not shown) is provided at an inner surface 101 of the first body 100 for inputting characters and numbers. A battery 110 for supplying power to the mobile handset device is mounted at an outer surface 102 of the first body 100, the outer surface of the first body opposite to the inner surface 101 of the first body 100 on which the keypad is provided.

A display is provided on the second body 200 for displaying text information and image information. The display is divided into an inner display 215 (not shown) provided at an inner surface 201 of the second body 200 and an external display 220 provided at an outer surface 202 of the second body. A camera module 210 is provided at the top of the outer surface 202 of the second body 200 for capturing an image. The inner surface 201 of the second body 200 is opposite and adjacent to the inner surface 101 of the first body 100 when the mobile handset device 50 is in a closed configuration.

A connection with an external device, such as a computer, is possible by using a receptacle 120 provided at one end of the first body 100. A sound source downloaded from an external computer via the connection through the receptacle 120 may be stored in a memory chip mounted in the first body 100.

A speaker unit 300 that can output a sound generated when a sound source, such as music stored in the memory chip, is reproduced is provided at the outer surface 202 of the second body 200. The speaker unit 300 is configured such that it can be in protruded configuration, such that the speaker unit extends from the outer surface 202 of the second body 200, or can be in a retracted configuration, such that the speaker unit is inside the second body.

Figure 4:
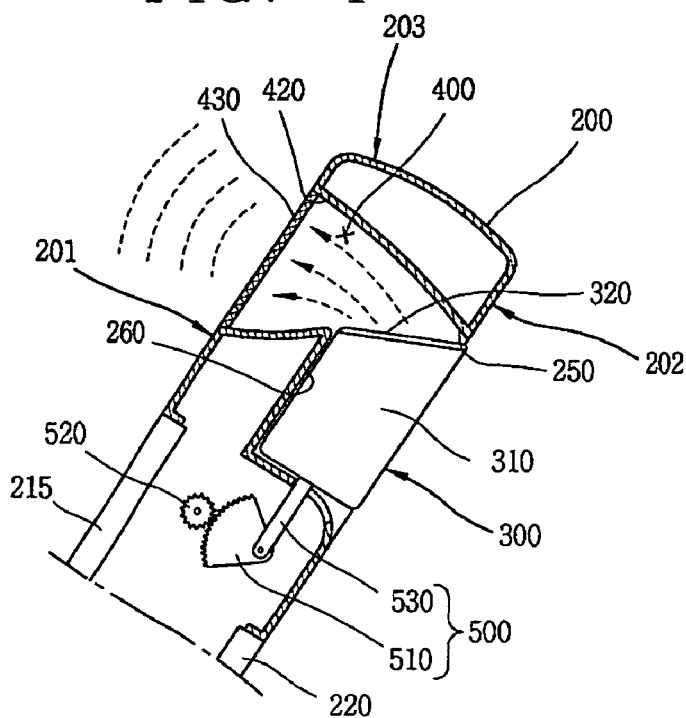
FIG. 4 illustrates a side view of a retracted configuration of a sound generation apparatus of a mobile handset device in accordance with one embodiment of the present invention.
Figure 5:
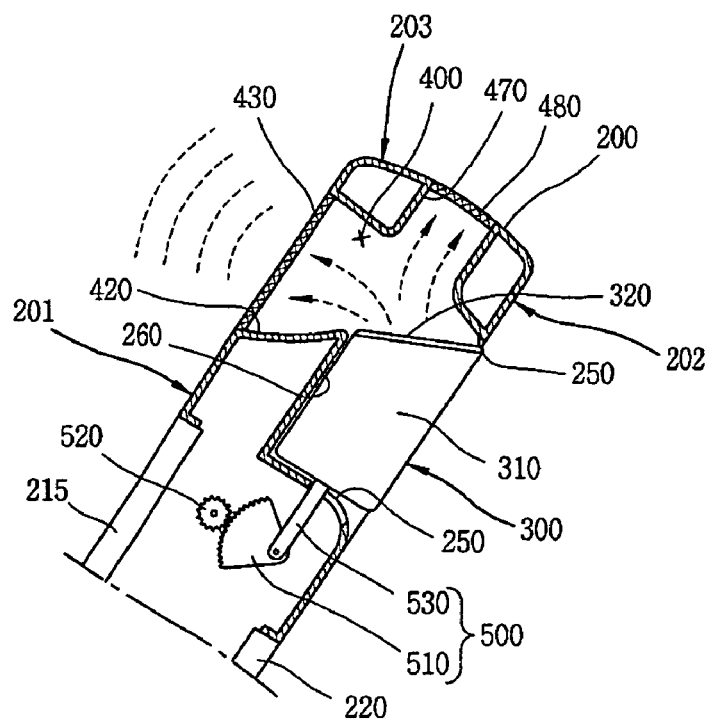
FIG. 5 illustrates a side view of a sound generation apparatus of a mobile handset device in accordance with another embodiment of the present invention.
Figure 6:
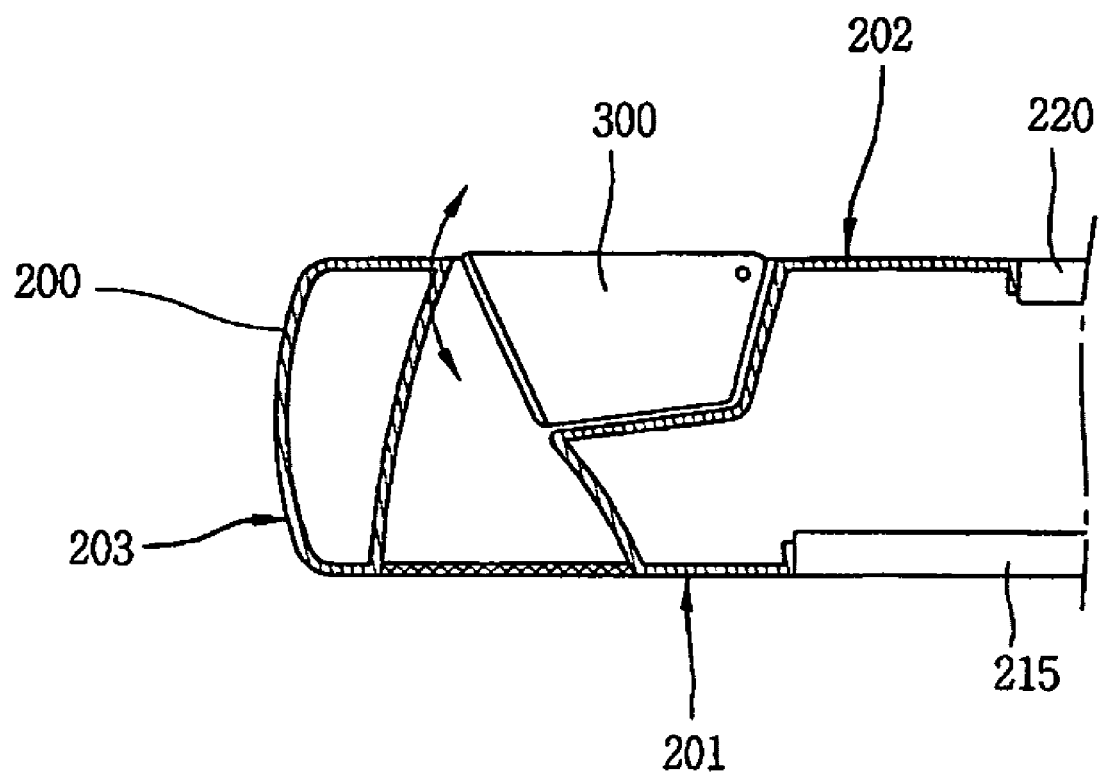
FIG. 6 illustrates a side view of a driving unit of a sound generation apparatus of a mobile handset device in accordance with one embodiment of the present invention.

The speaker unit 300 is shown in the protruded configuration in FIGS. 2 and 3 and shown in the retracted configuration in FIGS. 4-6. The protruded and retracted configurations of the speaker unit 300 may be chosen by manipulating a control function, such as an auxiliary control key 240 located at the outer surface 202 of the second body 200 or the keypad located at the inner surface 101 of the first body 100.

The speaker unit 300 includes two housings 310. Each housing 310 has an open end adapted to receive a speaker (not shown) therein and a cover 320 over the open end to allow sound generated from the speaker to be output outside the mobile handset device 50. The structure of the speaker unit 300 is shown in greater detail in FIG. 3.

Mounting holes 250 are formed in the second body 200 such that the speaker unit 300 can be mounted therein and can protrude out from the second body. A mounting portion 260 is formed inside each mounting hole 250 to allow the speaker unit 300 to be retracted inside the second body 200 when the mobile handset device 50 is in the closed configuration. When the speaker unit 30 is retracted against the mounting portion 260, the mounting holes 250 are completely closed by the speaker unit 300.

A sound transfer channel 400 is formed in the second body 200 to allow sound generated from the speaker unit 300 to be transmitted outside of the second body 200 when the mobile handset device 50 is in the closed configuration such that the speaker unit 300 is retracted into the second body 200. Through holes are formed on the second body 200 in order to output sound passing through the sound transfer channel 400 outside the second body 200.

As illustrated in FIG. 3, a first through hole 420 is formed at the inner surface 201 of the second body 200 in order to allow the sound transfer channel 400 to transfer sound outside the mobile handset device 50. As illustrated, one speaker unit 300 including two housings 310 is provided at the second body 200 and a plurality of first through holes 420 corresponding to the two housings 310 are provided.

Specifically, the first through holes 420 are constructed to correspond to each of the two housings 310. Each first through hole 420 is covered by a cover 430 that is constructed to allow sound to be transferred outside the second body 200.

FIG. 5 illustrates a second embodiment of the present invention. A second through hole 470 is formed at a lateral edge 203 of the second body 200 in addition to the first trough hole 420 at the inner surface 201 of the second body. Preferably, the second through hole 470 is formed at a front end of the second body 200.

A plurality of second through holes 470 may be provided corresponding to the number of housings 310. Specifically, the second through holes 470 are constructed to correspond to each housing 310. Preferably, the second through holes 470 are formed at regular intervals along the lateral edge 203 of the second body 200. Preferably, the speaker unit 300, the corresponding sound transfer channel 400 and the through holes 420, 470 are provided in an internal space between one end of the display 215, 220 and one end of the second body 200.

A driving unit 500 is provided in the second body 200 and operatively connected to the speaker unit 300 such that the speaker unit 300 may be retracted into the second body 200 or protruded from the second body. FIGS. 3 to 5 illustrate a driving unit 500 in accordance with one embodiment of the present invention.

The driving unit 500 is connected and fixed to a rear end of the speaker unit 300 in order to rotate the speaker unit. Specifically, the driving unit facilitates rotating the speaker unit 300 with respect to the outer surface 202 of the second body 200 such that the speaker unit 300 can protrude from or retract into the second body. Preferably, the housings 310 are rotated simultaneously and in the same direction.

The driving unit 500 includes a sector gear 510, a pinion 520 engaged with the sector gear 510 and a connection lever 530. One end portion of the connection lever 530 is fixed to a shaft of the sector gear 510 and the other end portion of the connection lever is fixed to the speaker unit 300. The pinion 520 may be connected, for example, in series with the shaft of a small-sized motor (not shown) fixed inside the second body 200. The driving unit 500 motor is driven when a control key provided on the first body 100 or the second body 200 is pressed.

FIG. 6 shows a driving unit in accordance with another embodiment of the present invention. The rear end of the speaker unit 300 is directly pin-coupled to the shaft of a motor (not shown) so that the speaker unit 300 can retract back into or protrude from the second body 200.

The operation of a speaker unit 300 in accordance with the present invention will now be described with reference to FIGS. 3-5. FIG. 3 illustrates a situation where a sound source file stored in an internal memory is reproduced with the first body 100 closed with respect to the second body 200, such that the mobile handset device 50 is in a closed configuration. FIGS. 4 and 5 illustrate a situation where a sound source file stored in an internal memory is reproduced with the first body 100 opened with respect to the second body 200, such that the mobile handset device 50 is in an open configuration Referring to FIG. 3, when a control key provided on the mobile terminal is pressed, the speaker unit 300 is in a protruded configuration after being extended from the outer surface 202 of the second body 200 by the driving unit 500. Specifically, the driving unit 500 motor is driven and the pinion 520 and sector gear 510 rotated together. As the sector gear 510 is rotated, the speaker unit 300 is rotated to protrude from the outer surface 202 of the second body 200. In this configuration, the cover 320 of the speaker unit 300 through which sound is output faces a user and the user can listen to a selected sound source file, such as music.

When the user stops listening to the selected sound source file, the control key is pressed and the operation of the driving unit reversed. Specifically, when the pinion 520 and the sector gear 510 are rotated in the reverse order, the speaker unit 300 also is rotated in the reverse order and retracts inside the second body 200 and against the mounting portions 260.

As illustrated in FIGS. 4 and 5, when the first body 100 is opened with respect to the second body 200 and a sound source file stored in an internal memory is reproduced, the driving unit 500 is not operated and the speaker unit 300 remains retracted inside the second body 200. Sound is output outside the second body 200 through the sound transfer channel 400 formed in the second body via the first through holes 420 and second through holes 470 such that the user can listen to the sound. On the other hand, the user may still listen to the sound with the speaker unit 300 is in the protruded configuration and extending from the outer surface 202 of the second body 200 by manipulating a control key.

Using a mobile handset device in accordance with the present invention, a user may listen to high-quality reproduced sound without distortion or interruption of sound wave propagation regardless of whether the first body 100 is open or closed with respect to the second body 200 because the speaker unit 300 can be made to protrude out of or be retracted into the second body. Even with the speaker unit 300 retracted into the second body 200 when the first body 100 is folded open with respect to the second body 200, a reproduced sound can be effectively transmitted outside the second body via the sound transfer channel 400 and the through holes 420, 470. Therefore, reliability and competitiveness of the product can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication device comprising:
a first body comprising an inner surface and an outer surface;
a second body coupled to the first body, the second body comprising an inner surface and an outer surface and adapted to move relative to the first body such that the mobile communication device has an open configuration and a closed configuration, the inner surface of the first body adjacent the inner surface of the second body in the closed configuration; and
a speaker unit installed in the second body such that sound generated when the mobile communication device is in the closed configuration is transferred directly outside the mobile communication device, wherein the speaker unit is installed at the outer surface of the second body and adapted to rotate in a perpendicular motion relative to the outer surface of the second body such that the speaker unit has a protruded configuration and a retracted configuration with respect to the outer surface of the second body, and wherein the speaker unit is inside the second body and not visible when the speaker unit is in the retracted configuration.

2. The device of claim 1, wherein the speaker unit comprises at least one pair of speakers adapted to move together when the speaker unit is moved between the protruded configuration and the retracted configuration.

3. The device of claim 1, wherein the speaker unit extends away from the outer surface of the second body when the speaker unit is in the protruded configuration.

4. The device of claim 3, further comprising a sound transfer channel formed in the second body and adapted to transfer sound outside the second body when the speaker unit is in the retracted configuration.

5. The device of claim 4, wherein the sound transfer channel further comprises a first plurality of through holes formed at the inner surface of the second body.

6. The device of claim 5, wherein the speaker unit comprises at least one pair of speakers and the first plurality of through holes are aligned with the at least one pair of speakers.

7. The device of claim 5, wherein the sound transfer channel further comprises a second plurality of through holes formed at a lateral surface of the second body.

8. The device of claim 7, wherein the second plurality of through holes are formed at regular intervals along the lateral surface of the second body.

9. The device of claim 3, further comprising at least one mounting hole formed in the second body, the at least one mounting hole receiving the speaker unit therein and wherein the at least one mounting hole is covered by the speaker unit when the speaker unit is in the retracted configuration.

10. The device of claim 9, wherein the at least one mounting hole comprises a mounting apparatus to which the speaker unit is mounted.

11. The device of claim 1, further comprising a keypad at the inner surface of the first body and a display on the second body and wherein the speaker unit is provided in a space formed between the display and an end of the second body.

12. The device of claim 1, further comprising a driving unit in the second body, the driving unit operatively connected to the speaker unit for facilitating movement of the speaker unit between the protruded configuration and the retracted configuration.

13. The device of claim 12, wherein the driving unit is connected to a rear surface of the speaker unit such that the driving unit pivots the speaker unit.

14. The device of claim 13, the driving unit comprising a sector gear installed in the second body, a pinion gear engaged with the sector gear and a connection lever and wherein a first end portion of the connection lever is attached to a shaft of the sector gear and a second end portion of the connection lever is attached to the speaker unit.

15. A mobile communication device comprising:

a first body comprising a keypad;

a second body coupled to the first body, the second body comprising a display and adapted to move relative to the first body such that the mobile communication device has an open configuration and a closed configuration; and a speaker unit installed in the second body and adapted to rotate in a perpendicular motion relative to an outer surface of the second body in a protruded configuration or a retracted configuration, such that sound generated when the mobile communication device is in the closed configuration is transferred directly outside the mobile communication device, wherein the speaker unit is inside the second body and not visible when the speaker unit is in the retracted configuration.

16. The device of claim 15, wherein the speaker unit is installed in a space between the display and an end of the second body.

17. The device of claim 15, further comprising a sound transfer channel formed in the second body and adapted to transfer sound outside the second body when the speaker unit is in a retracted configuration.

18. The device of claim 17, wherein the sound transfer channel further comprises a plurality of through holes formed at an inner surface of the second body.

19. The device of claim 17, wherein the sound transfer channel further comprises a plurality of through holes formed at a lateral surface of the second body.

* * * * *